United States Patent
Litvinets et al.

(10) Patent No.: US 9,863,230 B2
(45) Date of Patent: Jan. 9, 2018

(54) HETEROGENEOUS PROPPANT PLACEMENT IN A FRACTURE WITH REMOVABLE EXTRAMETRICAL MATERIAL FILL

(75) Inventors: Fedor Nikolaevich Litvinets, Biysk (RU); Andrey Vladimirovich Bogdan, Novosibirsk (RU); Sergey Mikhailovich Makarychev-Mikhaliov, St. Petersburg (RU); Oleg Medvedev, Kyiv (UA); Alejandro Pena, Katy, TX (US); Konstantin Mikhailovich Lyapunov, Novosibirsk (RU); Alexander Vuacheslavovich Mikhaylov, Novosibirsk (RU); Timothy M. Lesko, Sugar Land, TX (US); J. Ernest Brown, Fort Collins, CO (US); Dean M. Willberg, Salt Lake City, UT (US); Ivan Vitalievich Kosarev, Moscow (RU); Anatoly Vladimirovich Medvedev, Moscow (RU); Jonathan Abbott, Didcot (GB); Alexander Alexandrovich Burukhin, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 13/494,503

(22) Filed: Jun. 12, 2012

(65) Prior Publication Data
US 2013/0146292 A1 Jun. 13, 2013

Related U.S. Application Data

(60) Provisional application No. 61/520,788, filed on Jun. 15, 2011.

(51) Int. Cl.
*E21B 43/267* (2006.01)

(52) U.S. Cl.
CPC ................... *E21B 43/267* (2013.01)

(58) Field of Classification Search
CPC ............... E21B 43/267; E21B 43/26
(Continued)

(56) References Cited

U.S. PATENT DOCUMENTS

| 4,143,715 A | 3/1979 | Pavlich |
| 4,848,467 A | 7/1989 | Cantu et al. |

(Continued)

FOREIGN PATENT DOCUMENTS

WO 2009/096805 8/2009

OTHER PUBLICATIONS

Reservoir Stimulation, 3rd Ed., M. J. Economides, K. G. Nolte, Editors, John Wiley and Sons, New York, 2000.
(Continued)

*Primary Examiner* — Silvana Runyan
(74) *Attorney, Agent, or Firm* — Michael L. Flynn; Robin Nava

(57) ABSTRACT

A method of injecting well treatment fluid including proppant and proppant-spacing filler material through a wellbore into the fracture, heterogeneously placing the proppant in the fracture in a plurality of proppant clusters or islands spaced apart by the material, and removing the filler material to form open channels around the pillars for fluid flow from the formation through the fracture toward the wellbore. The proppant and channelant can be segregated within the well treatment fluid, or segregated during placement in the fracture. The filler material can be dissolvable particles, initially acting as a filler material during placement of the proppant in the fracture, and later dissolving to leave the flow channels between the proppant pillars. The well treatment fluid (Continued)

can include extrametrical materials to provide reinforcement and consolidation of the proppant and/or to inhibit settling of the proppant.

29 Claims, 4 Drawing Sheets

(58) Field of Classification Search
USPC .......... 166/250.01, 250.1, 280.1, 280.2, 300, 166/305.1, 308.1, 308.2, 308.3
See application file for complete search history.

(56) References Cited

U.S. PATENT DOCUMENTS

| | | | |
|---|---|---|---|
| 4,957,165 A | 9/1990 | Cantu et al. | |
| 4,986,355 A | 1/1991 | Casad et al. | |
| 6,776,235 B1* | 8/2004 | England | 166/271 |
| 6,949,491 B2 | 9/2005 | Cooke | |
| 7,044,220 B2 | 5/2006 | Nguyen et al. | |
| 7,213,651 B2 | 5/2007 | Brannon et al. | |
| 7,281,581 B2 | 10/2007 | Nguyen et al. | |
| 7,325,608 B2 | 2/2008 | van Batenburg et al. | |
| 7,392,843 B2* | 7/2008 | Ortiz et al. | 166/280.1 |
| 7,413,017 B2* | 8/2008 | Nguyen | C09K 8/68 166/280.1 |
| 7,581,590 B2* | 9/2009 | Lesko et al. | 166/280.1 |
| 2004/0152601 A1 | 8/2004 | Still et al. | |
| 2006/0048943 A1 | 3/2006 | Parker et al. | |
| 2006/0048944 A1 | 3/2006 | van Batenburg et al. | |
| 2006/0289160 A1* | 12/2006 | van Batenburg et al. | 166/280.2 |
| 2008/0128131 A1 | 6/2008 | Nguyen et al. | |
| 2008/0135242 A1 | 6/2008 | Lesko et al. | |
| 2008/0149329 A1* | 6/2008 | Cooper et al. | 166/250.01 |
| 2009/0044945 A1* | 2/2009 | Willberg et al. | 166/308.1 |
| 2010/0252268 A1* | 10/2010 | Gu et al. | 166/308.1 |
| 2010/0263870 A1* | 10/2010 | Willberg et al. | 166/305.1 |
| 2010/0282464 A1 | 11/2010 | Medvedev et al. | |
| 2011/0036571 A1* | 2/2011 | Vitalievich | E21B 43/11 166/280.1 |
| 2011/0120713 A1* | 5/2011 | Todd et al. | 166/280.1 |

OTHER PUBLICATIONS

Encyclopedia of Chemical Technology, Edited by Raymond E. Kirk and Donald F. Othmer, Third Edition, John Wiley & Sons, vol. 16, pp. 248-273 (entitled "Nuts"), Copyright 1981.
Kirk et al., Encyclopedia of Chemical Technology, 3rd Edition, vol. 23, John Wiley and Sons, pp. 848-865 (1983).
International Search Report for the equivalent PCT patent application No. PCT/US2012/042180 dated Oct. 25, 2012.

* cited by examiner

HETEROGENEOUS PROPPANT PLACEMENT IN A FRACTURE WITH REMOVABLE EXTRAMETRICAL MATERIAL FILL

CROSS-REFERENCE TO RELATED APPLICATIONS

The present application claims priority to U.S. Provisional Patent Application No. 61/520,788, filed Jun. 15, 2011, the disclosure of which is incorporated by reference herein in its entirety.

TECHNICAL FIELD OF THE INVENTION

Embodiments relate to stimulation of wells penetrating subterranean formations, and more specifically to fracture stimulation by injection of proppant into a fracture to form regions of low resistance to flow through the fracture for the production of hydrocarbons.

BACKGROUND

The statements in this section merely provide background information related to the present disclosure and may not constitute prior art.

Various methods are known for fracturing a subterranean formation to enhance the production of fluids therefrom. In the typical application, a pressurized fracturing fluid hydraulically creates and propagates a fracture. The fracturing fluid carries proppant particulates into the extending fracture. When the fracturing fluid is removed, the fracture does not completely close from the loss of hydraulic pressure; instead, the fracture remains propped open by the packed proppant, allowing fluids to flow from the formation through the proppant pack to the production wellbore.

The success of the fracturing treatment may depend on the ability of fluids to flow from the formation through the proppant pack. In other words, the proppant pack or matrix must have a high permeability relative to the formation for fluid to flow with low resistance to the wellbore. Furthermore, the surface regions of the fracture should not be significantly damaged by the fracturing to retain fluid permeability for optimal flow from the formation into the fracture and the proppant pack.

The prior art has sought to increase the permeability of the proppant pack by increasing the porosity of the interstitial channels between adjacent proppant particles within the proppant matrix. For example, United States Patent Application Publication Number 20060048944A1 (van Batenburg, et al.) discloses a method of forming a high porosity propped fracture with a slurry that includes a fracturing fluid, proppant particulates and a weighting agent. These prior art technologies seek to distribute the porosity and interstitial flow passages as uniformly as possible in the consolidated proppant matrix filling the fracture, and thus employ homogeneous proppant placement procedures to substantially uniformly distribute the proppant and non-proppant, porosity-inducing materials within the fracture.

As another example, in United States Patent Application Publication Number 20060048943A1 (Parker, et al.) proppant particulates and degradable material do not segregate before, during or after injection to help maintain uniformity within the proppant matrix. Fracturing fluids are thoroughly mixed to prevent any segregation of proppant and non-proppant particulates. In another approach, non-proppant materials have a size, shape and specific gravity similar to that of the proppant to maintain substantial uniformity within the mixture of particles in the fracturing fluid and within the resulting proppant pack. A tackifying compound coating on the particulates has also been used to enhance the homogenous distribution of proppant and non-proppant particulates as they are blended and pumped downhole into a fracture.

A recent approach to improving hydraulic fracture conductivity has been to try to construct proppant clusters in the fracture, as opposed to constructing a continuous proppant pack. U.S. Pat. No. 6,776,235 (England) discloses a method for hydraulically fracturing a subterranean formation involving alternating stages of proppant-containing hydraulic fracturing fluids contrasting in their proppant-settling rates to form proppant clusters as posts that prevent fracture closing. This method alternates the stages of proppant-laden and proppant-free fracturing fluids to create proppant clusters, or islands, in the fracture and channels between them for formation fluids to flow. The amount of proppant deposited in the fracture during each stage is modulated by varying the fluid transport characteristics (such as viscosity and elasticity), the proppant densities, diameters, and concentrations and the fracturing fluid injection rate. However, the positioning of the proppant-containing fluid is difficult to control. This can result in non-uniform distribution of proppant clusters, which in turn can lead to excessive fracture closure where there is not enough proppant and constricted flow channels where there is too much proppant.

SUMMARY

According to some embodiments, a fracturing treatment includes the injection of both proppant and a removable material that can act as fill to physically separate the proppant clusters at appropriate distances during placement in the fracture, but can subsequently be removed to form channels. The proppant and removable material are disposed within a fracture in such a way that the removable material is segregated from the proppant to act as a temporary filler material compressed in the fracture in spaces between clusters or islands of proppant which form pillars to hold open the fracture. Then, the fill material is removed to form open channels for unimpeded fluid flow through the fracture in the spaces left around the proppant pillars. Applicant refers herein to the removable, extrametrical material, channel-forming fill material as "channelant." In alternative embodiments the extrametrical material may not necessarily serve as a channelant.

In one aspect, embodiments are related to methods of heterogeneous proppant placement in a subterranean fracture accomplished by injecting well treatment fluid through a wellbore into a fracture in a subterranean formation. The treatment fluid can include proppant and proppant-spacing extrametrical material. The proppant can be placed in the fracture in a plurality of proppant clusters forming pillars spaced apart by the extrametrical material. Then, the extrametrical material can be removed to form open channels around the pillars for fluid flow from the formation through the fracture toward the wellbore.

In another aspect, embodiments are related to methods of treating a subterranean formation penetrated by a wellbore, wherein a fracture is formed within the formation by injecting a fluid into the wellbore at a pressure equal to or greater than the fracture initiation pressure of the formation, followed by injecting one or more stages each of a proppant laded well treatment fluid and extrametrical material laden fluid, these fluid injected separately and/or simultaneously.

The extrametrical material may then be removed to form open channels around pillars of proppant for fluid flow from the formation through the fracture toward the wellbore. Removal of the extrametrical material may be influenced by such factors as invasion of formation fluids, by exposure to water, by passage of time, by the presence of incipient or delayed reactants in or mixed with the extrametrical material particles, by the post-injection introduction of an activating fluid, and the like, or any combination of thereof.

In an embodiment, the extrametrical material can include solid particles that can be consolidated between the proppant islands or pillars. In an embodiment, the proppant and extrametrical material particles can be segregated during injection of the well treatment fluid. In another embodiment, the extrametrical material particles can be maintained in a solid state within the fracture.

The injection can include injecting a proppant-lean carrier stage to initiate the fracture; and thereafter injecting into the fracture proppant and extrametrical material.

In an embodiment, the injection can further include injecting a tail-in stage to form a permeable proppant pack in the fracture between the open channels and the wellbore.

In an embodiment, the treatment fluid can have mixed phases including a proppant-rich phase and an extrametrical material-rich phase. In embodiments, the proppant-rich phase can be discontinuous. Alternatively or additionally, the extrametrical material-rich phase can be continuous. In another embodiment, the treatment fluid can alternate volumes of proppant-rich fluid separated by volumes containing the extrametrical material.

The treatment fluid can alternatively or additionally include a mixture of proppant and extrametrical material during the injection, and the method can include the step of segregating the proppant and extrametrical material for the fracture placement. In an embodiment, the segregation can be facilitated by density differences between the proppant and extrametrical material. Alternatively or additionally, the segregation can be facilitated by differences between the proppant and extrametrical material.

Extrametrical material in one embodiment can include a solid acid-precursor to generate acid in the fracture. The generated acid can be used for gel breaking in the fracturing fluid. In another embodiment, the generated acid can etch surfaces of the formation to enlarge the channels. Alternatively or additionally, the generated acid can facilitate consolidation of the proppant clusters.

The proppant can be sand, nut hulls, ceramics, bauxites, glass, and the like and combinations thereof. In one embodiment, the proppant includes ceramic particles having a narrow particle size distribution and sand having a broad particle size distribution. Resin coated proppants (various resin and plastic coatings) having a base of any of the previously listed propping materials such as sand, ceramics, bauxite, nut shells, etc. may be used in accordance with the invention. Also other proppants like, plastic beads such as styrene divinylbenzene, and particulate metals may be used. Proppant used in this application may not necessarily require the same permeability properties as typically required in conventional treatments because the overall fracture permeability will at least partially develop from formation of channels. Other proppants may be materials such as drill cuttings that are circulated out of the well and/or other ground minerals, as shales, mica, and the like, or even ground waste of any kind, such as slag, scoria, sinter, ash, ground plastic, crushed glass, ground metal etc., and of which if properly consolidated, waste pillars can provide sufficient strength, particularly at low closure stress, as well as any combinations of any of the previous mentioned material types. In an embodiment, the proppant can be in the form of spheres, rods, platelets, irregular shapes and the like and combinations thereof. Many other organic materials could be resin coated and possible applied such as wood chips or various seeds, and the like. Essentially, the proppant can be any material that will hold open the propped portion of the fracture.

The extrametrical material can be any material degradable or dissolvable after placement within the fracture. The extrametrical material can be, for example, polylactic acid (PLA), polyglycolic acid (PGA), polyol, polyethylene terephthalate (PET), nylon 6, nylon 6,6, polyester, polyamide, polyolefin, polysaccharide, wax, salt, calcium carbonate, benzoic acid, naphthalene based materials, magnesium oxide, sodium bicarbonate, soluble resins, sodium chloride, calcium chloride, ammonium sulfate, and the like, or a combination thereof. The extrametrical material can have a size and shape matching the size and shape of the proppant to promote segregation. In an embodiment, the channelant can be in the form of spheres, fibers, rods, platelets, ribbons, and the like and combinations thereof.

In some embodiments the extrametrical materials can be, for example, glass, ceramics, carbon including carbon-based compounds, metal including metallic alloys, or the like, or a combination thereof, or a polymeric material such as PLA, PGA, PET, polyol, polyamide, polyimide, or the like, or a combination thereof. In an embodiment, the extrametrical materials can form of an extrametrical material-based network. In an embodiment, the extrametrical materials can provide reinforcement and consolidation of the proppant. In another embodiment, the extrametrical materials can inhibit differential settling of proppant in the treatment fluid.

In yet another embodiment, the treatment fluid can include a mixture of first and second extrametrical material types, the first extrametrical material type providing reinforcement and consolidation of proppant, and the second extrametrical material type inhibiting settling of the proppant in the treatment fluid. The first extrametrical material type can be one of glass, ceramics, carbon and carbon-based compounds, metals and metallic alloys, or the like or a combination thereof, and the second extrametrical material type can be PLA, PGA, PET, polyol, polyamide, polyimide, or the like, or a combination thereof.

Alternatively or additionally, the proppant can be self-adherent and/or non-adherent to the extrametrical material. The proppant can have a self-adherent coating, for example. Similarly, the extrametrical material of another embodiment can be self-adherent and/or non-adherent to the proppant. The extrametrical material can have a self-adherent coating, for example.

In another embodiment, the proppant can have hydrophobic surfaces and the extrametrical material can have hydrophilic surfaces. Alternatively, the proppant can have hydrophilic surfaces and the extrametrical material hydrophobic surfaces.

In yet another aspect, method embodiments include injecting a plurality of stages of a well treatment fluid through a wellbore into a fracture in a subterranean formation, the stages of the fluid containing at least one of a proppant and an extrametrical material. The extrametrical material comprises at least one of a solid acid-precursor to generate acid in the fracture, and a solid base-precursor to generate a base in the fracture (in either case, a suitable acid or base is a material which alters the pH of an aqueous median, in either a decreasing or increasing direction, respectively). The proppant is placed in the fracture in a plurality of proppant clusters to form pillars. The extrametrical material then dissolves in the fracture, which may further enable fluid flow from the formation through the fracture toward the wellbore (the term 'dissolve' in the present application means any suitable process, either chemical or mechanical, by which the extrametrical material voids the fracture space occupied).

In yet other embodiments, methods involve injecting a plurality of stages of a well treatment fluid through a wellbore into a fracture in a subterranean formation, where the stages of the fluid containing at least one of a proppant and a extrametrical material, and placing the proppant in the fracture in a plurality of proppant clusters to form pillars. The extrametrical material subsequently dissolves. The zone contacted by the treatment fluid in the formation comprises fine grained sedimentary rock formed by consolidation of clay and silt sized particles into thin, relatively impermeable layers.

A further aspect involves methods where a plurality of stages of a well treatment fluid are injected through a deviated wellbore into a fracture in a subterranean formation, and the stages of the fluid contain at least one of a proppant and an extrametrical material. The proppant is placed in the fracture in a plurality of proppant slugs; and the placed extrametrical material is allowed to dissolve. The treatment fluid stages are alternate volumes of proppant-rich fluid separated by volumes of extrametrical material-rich fluid.

In some embodiments, the pulsing fracturing treatment schedule is combined with homogeneous stage at the end of the treatment. Such approach may provide a substantial increase in the fracture conductivity achieved by loading a heterogeneous proppant pack (combination of proppant pillars) into the fracture.

Some embodiments are methods of reservoir stimulation with increased fracture conductivity, achieved by heterogeneous proppant placement in a hydraulic fracture. The method provides a treatment pumping schedule with parameters, optimized based on reservoir geomechanical properties. Design optimization can be performed either prior to the treatment or in real time. Different embodiments of design optimization are disclosed.

Any of the methods also include the step of producing fluids such as hydrocarbons, or any other suitable fluids, from the formation through the open channels and the wellbore.

BRIEF DESCRIPTION OF THE DRAWINGS

FIG. 1 schematically illustrates in section placement of proppant and removable extrametrical material in a hydraulic fracture operation according to an embodiment of the.

DETAILED DESCRIPTION

Figure 1:
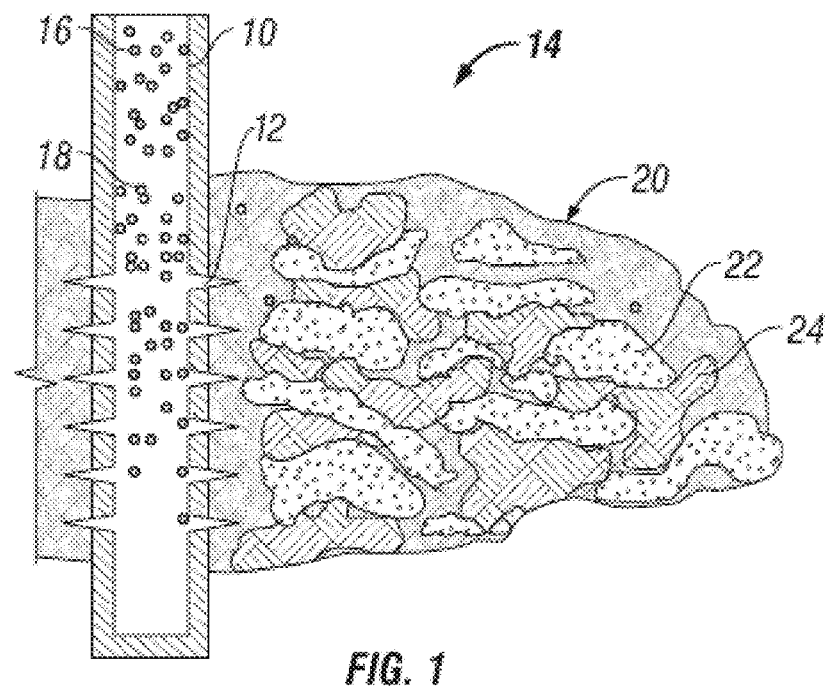

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Fracturing fluids according to the present method can include proppant and a removable proppant-spacing material, which can function to form open channels around the proppant pillars. In some embodiments, these extrametrical channel-forming materials, including proppant-spacing particles, are referred to herein as "channelant." In other embodiments, the extrametrical material may not necessarily serve as a channelant, but may be at least partially, or even removable under formation conditions, while in some cases the extrametrical material may not be removable.

As used herein, the term "open channels" refers to interconnected passageways formed in the proppant-fracture structure. Open channels are distinct from interstitial passages between individual proppant particles in the proppant matrix in that the channels fully extend between opposing fracture faces, free of obstruction by proppant or other flow-impeding structures, and exist outside the proppant matrix, laterally bounded by the proppant pillars. Such open channels generally have a hydraulic radius, and hence a hydraulic conductivity, that is at least an order of magnitude larger than that of interstitial flow passages through the proppant matrix.

The open channels can be formed by placing the proppant and extrametrical material in the fracture in such a way that the pillar-forming proppant islands are ultimately segregated from the channel-forming removable material. The segregation can occur or begin in the preparation, mixing or pumping of the treatment fluid, in the injection of the treatment fluid in the fracture, in or after the proppant placement, packing or settling in the fracture, by a distinct post-injection step of chemical and/or mechanical manipulation or treatment of the proppant/extrametrical material following initial placement in the fracture, or by aggregating and consolidating the proppant during the extrametrical material removal.

As used herein, the terms "segregation," "segregating" and the like refer to any heterogeneous proppant/extrametrical material distribution between proppant-rich pillar-forming islands or regions and proppant-lean extrametrical material regions. It may not be necessary to keep the proppant-rich regions entirely free of extrametrical material because the presence of extrametrical material, especially in relatively minor amounts, may not exceed any level that prevents the formation or consolidation of the proppant into pillars of sufficient strength to prevent the fracture from closing. In an embodiment, the extrametrical material can function in the proppant or proppant regions to consolidate or reinforce the proppant islands and/or to strengthen the proppant pillars. Conversely, the extrametrical material regions can contain proppant particles, especially relatively minor amounts, which remain unconsolidated or do not otherwise prevent removal of the extrametrical material to form the open channels and which do not result in obstruction or excessive clogging of the open channels by the proppant.

A simplified embodiment of the method is illustrated with reference to FIGS. 1-2, in which the extrametrical material particles can be generally insoluble in the injection fluid and soluble in the formation fluid. In FIG. 1, a wellbore 10 can be completed with perforations 12 in formation 14. Segregated proppant particles 16 and extrametrical material particles 18 can be injected in a fracturing fluid through the wellbore 10 into a fracture 20, where they can be heterogeneously placed in respective proppant-rich islands 22 spaced apart by extrametrical material-rich regions 24. The fracture 20 can be allowed to close, and the proppant islands 22 compressed to form pillars to support the fracture 20 and prevent the opposing fracture faces from contacting each other. Simultaneously, the extrametrical material can be packed in the proppant-lean regions 24 and can help restrict the islands 22 from creeping or spreading laterally due to compression by the weight of the formation, thereby facilitating a greater height or open dimension of the resulting propped fracture and a greater hydraulic conductivity.

During the next operative step, the extrametrical material can be removed in various embodiments by flushing, dissolving, softening, melting, breaking, or degrading the extrametrical material, wholly or partially, via a suitable activation mechanism, such as, but not limited to, temperature, time, pH, salinity, solvent introduction, catalyst introduction, hydrolysis, and the like, or any combination thereof. The activation mechanism can be triggered by ambient conditions in the formation, by the invasion of formation fluids, exposure to water, passage of time, by the presence of incipient or delayed reactants in or mixed with the extrametrical material particles, by the post-injection introduction of an activating fluid, or the like, or any combination of these triggers.

Figure 2:
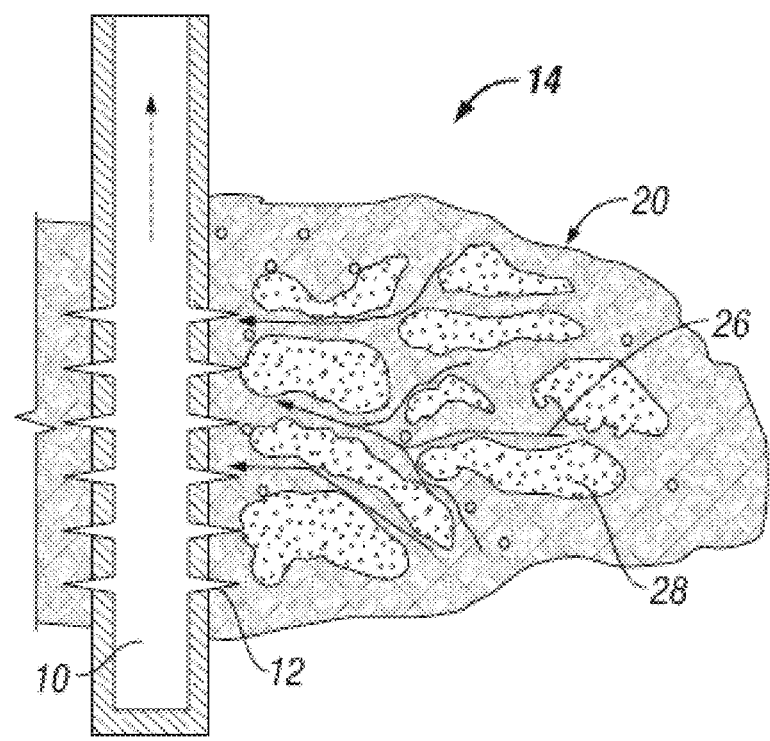
FIG. 2 schematically illustrates in section the arrangement of the wellbore, perforations and the proppant pillars in the fracture following removal of the extrametrical material from the fracture of FIG. 1.

Then, with reference to FIG. 2, the formation fluid can be allowed to invade the fracture 20 to displace any extrametrical material, extrametrical material solution, extrametrical material degradation products, and any unconsolidated proppant or other particles, from the proppant-lean regions. In one embodiment, the extrametrical material can simply be unconsolidated so that it can be removed hydraulically, or can include unconsolidated particles that can be removed hydraulically, e.g. by flushing the fracture with formation fluid and/or an injected flushing or back-flushing fluid. A network of interconnected open channels 26 can thus be formed around the pillars 28 to provide the fracture 20 with high conductivity for fluid flow. Fluids can now be produced from the formation 14, into the fracture 20, through the open channels 26 and perforations 12, and into the wellbore 10.

The extrametrical material can, in some cases, be removed mechanically, for example by using fluid to push extrametrical material out of the formation. In such instances, the extrametrical material can remain in a solid state from the time of injection through removal from the fracture. Some suitable materials that can resist degradation and crushing include glass, ceramics, carbon and carbon-based compounds, metals and metallic alloys, naturally occurring and synthetic minerals, and high-density plastics that are oil-resistant and exhibit a crystallinity of greater than about 10%. Some other suitable high density plastic materials include nylons, acrylics, styrenes, polyesters, polyethylenes, oil-resistant thermoset resins, and combinations thereof.

Alternatively, the extrametrical material can be softened, dissolved, reacted or otherwise made to degrade. Materials suitable for dissolvable extrametrical material include for example, and without limitation, polyvinyl alcohol (PVOH) extrametrical materials, salt, wax, calcium carbonate, and the like and combinations thereof. An oil-degradable extrametrical material can be selected, so that it will be degraded by produced fluids. Alternatively, an extrametrical material can be selected which is degraded by agents purposefully placed in the formation by injection, wherein mixing the extrametrical material with the agent induces a delayed reaction degradation of the extrametrical material.

In some fracturing operations of the present invention, a solid acid-precursor can be used as the degradable extrametrical material. Suitable acid-generating dissolvable extrametrical materials can include for example, and without limitation, PLA, PGA, carboxylic acid, lactide, glycolide, copolymers of PLA or PGA, and the like and combinations thereof. Provided that the formation rock is carbonate, dolomite, sandstone, or otherwise acid reactive, then the hydrolyzed product of the extrametrical material, a reactive liquid acid, can etch the formation at surfaces exposed between the proppant pillars. This etching can enlarge the open channels and thus further enhance the conductivity between the pillars. Other uses of the generated acid fluid can include aiding in the breaking of residual gel, facilitating consolidation of proppant clusters, curing or softening resin coatings and increasing proppant permeability.

In some embodiments of the invention, the extrametrical material may be formed of, or contain, a fluoride source capable of generating hydrofluoric acid upon release of fluorine and adequate protonation. Some nonlimiting examples of fluoride sources which are effective for generating hydrofluoric acid include fluoboric acid, ammonium fluoride, sodium fluoride, and the like, or any mixtures thereof.

Figure 3:
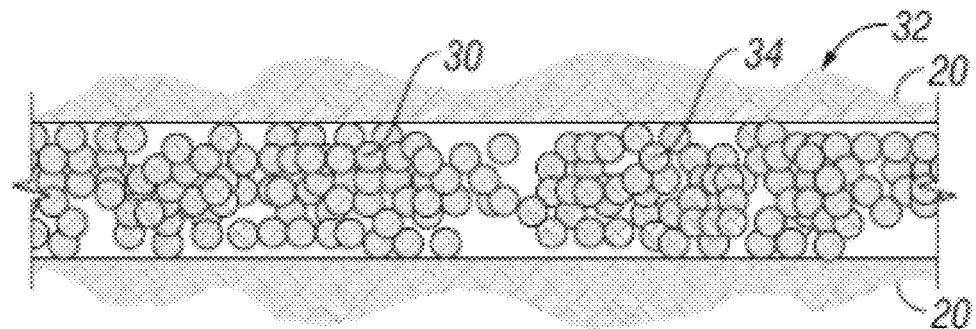
FIG. 3 schematically illustrates a side sectional view of a fracture filled with segregated proppant and degradable solid acid-precursor as extrametrical material in a carbonate formation according to one embodiment.
Figure 4:
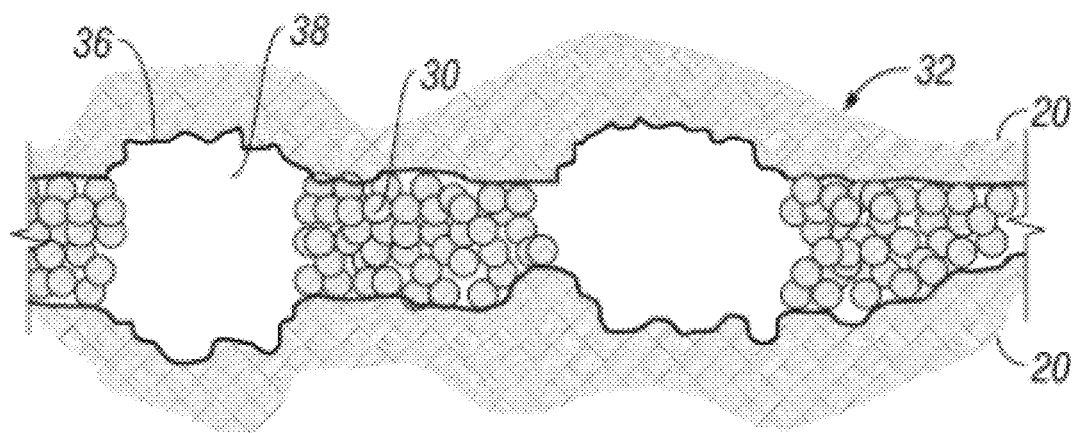
FIG. 4 schematically illustrates a side sectional view of the fracture of FIG. 3 following hydrolysis of the solid acid-precursor and etching at the faces of the fracture in the vicinity of the acid formed thereby.

FIGS. 3-4 illustrate the acid etching process for greater fracture conductivity. In reference to FIG. 3, proppant islands 30 are heterogeneously placed in fracture 32 with a degradable solid acid-precursor in the extrametrical material-rich regions 34. In reference to FIG. 4, delayed hydrolysis of the acid-precursor extrametrical material at formation conditions forms an acid that cuts into the face of the carbonate formation, resulting in localized etching 36 to enlarge the channels 38. The proppant pillars 30 remain intact to prop open the fracture.

The approach of heterogeneous proppant placement (HPP) is embodied in some aspects of the invention. Heterogeneous proppant packs, hereinafter referred as proppant pillars, may prevent fracture closure and provide highly conductive channels around pillars serving as flow path for hydrocarbons. The HPP results in a number of benefits, compared to conventional stimulation treatments, as increased fracture conductivity, improved fracture clean up, longer effective fracture length, reduced consumption of proppant and other.

The method of HPP according to some embodiments relies on pulsation of proppant concentration during fracturing treatment, which results in HPP. Parameters of the treatment schedule, as duration of proppant slurry and clean fluid pulses, proppant concentration, carrier fluid design. Optimization of the above and other design parameters, based on the geomechanical properties of a treated reservoir, can significantly enhance fracture conductivity and effective length, eventually leading to hydrocarbon production increase.

Figure 5:
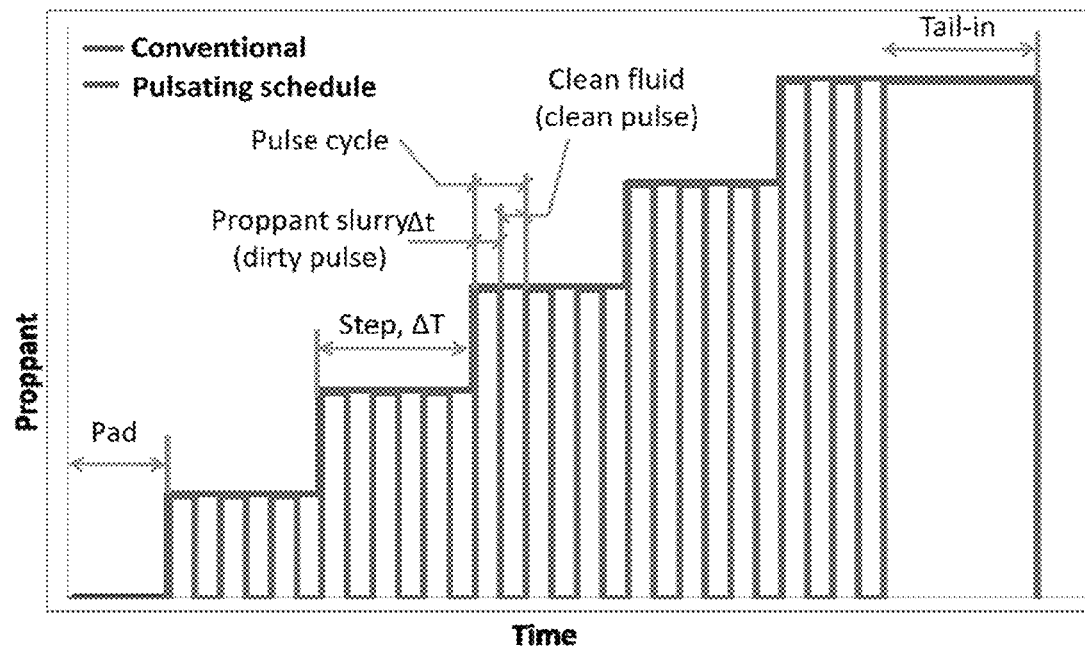
FIG. 5 schematically illustrates an example of pulsation schedule according to one embodiment where time is on the x-axis and proppant concentration on the y-axis.

In some embodiments, the treatment schedule, utilizes a proppant pulsing schedule as shown in FIG. 5. The first stage is a proppant free stage, called PAD, that aims to initiate fracture and define its geometry. After that a number of proppant stages may be pumped with increasing proppant concentration. All or some proppant stages may be pumped in cycles, with every cycle consisting of clean fluid pulse and proppant slurry pulse of the same or different duration. The proppant concentration in proppant slurry pulses is kept similar or the same for every stage. In the last proppant stage, or otherwise known as 'Tail-In', the schedule is pumped without pulses and serves as a connection between the channeled fracture and a wellbore.

In some methods, pulse duration and proppant concentration may be varied and optimized. Pumping rate may be a tool, as having the same pulse duration can provide different pulse volumes and correspondingly different spacing between pillars. In some cases, optimization of pulse/slug volume and/or duration and/or change pumping rate during pulses can be conducted.

Conductivity of channeled fracture may depend upon the pillar width, the distance between the pillars, the stress exerted by pillars, geomechanical properties of formation and other factors. The pillar width may depend upon concentration of proppant in proppant pulses and the hydraulic fracture width. Distance between pillars may be related to clean fluid pulse duration. The stress on pillars can be related to minimum in-situ stress in formation and percent fracture wall area covered by pillars.

Some embodiments are called to methods of optimization of the treatment pumping schedule, in particular on duration of stages, proppant concentration in pulses and clean fluid/proppant slurry pulse duration, which can provide an optimally achievable fracture conductivity. The inverse approach further allows to define the schedule parameters so to provide predetermined fracture geometry and conductivity with less proppant and/or fracturing fluid.

Figure 6:
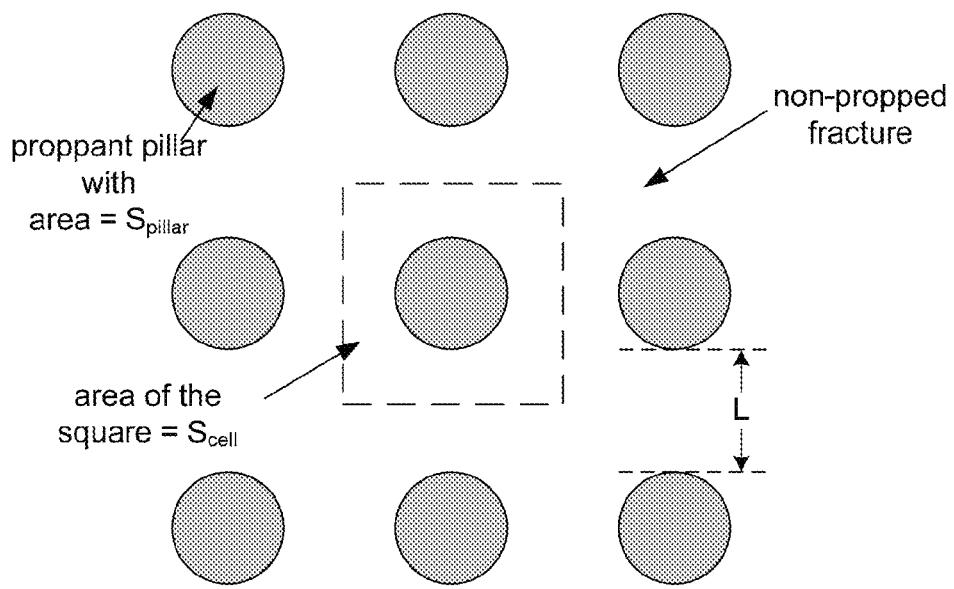
FIG. 6 schematically illustrates fractures filled with system of pillars so that there are open channels remain between pillars.
Figure 7:
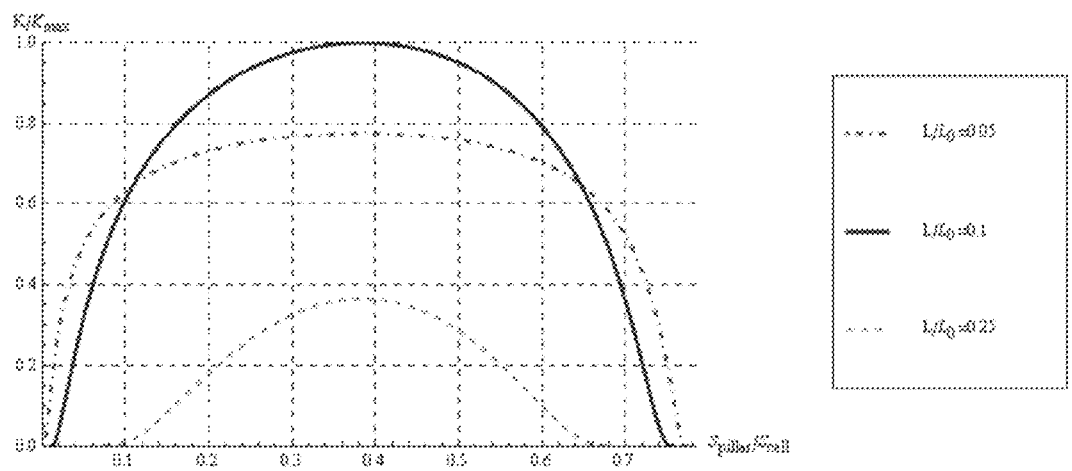
FIG. 7 illustrates how channel conductivity may depend upon propped fracture area for different ratio $L/L_0$.
Figure 8:
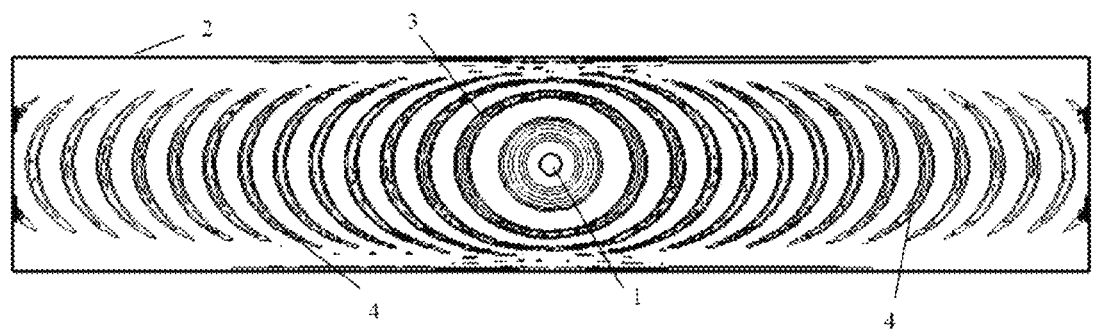
FIG. 8 describes the results of numerical simulation for proppant transport in a horizontal transverse fracture (with black areas representing proppant). Notations: 1—wellbore, 2—boundaries of the hydraulic fracture (transverse, located between stress barriers with confined height growth), 3—proppant pulses transported radial in the central part of the fracture, 4—proppant pulses transported horizontally in the wings of the fracture.

In a first example, during the treatment the portion, of the fracturing fluid leaks off into formation. This may result in fluid efficiency decrease and may also reduce the distance between proppant pillars in the fracture with increase of the proppant concentration. The friction properties of the fracturing fluid (effective viscosity) is known to govern the hydraulic fracture width. Based on simulations of the leak off and friction properties of the fluid, known from the art, the proppant concentration in the slurry pulses, as well as the durations of the proppant slurry and the clean fluid pulses can be calculated and the fracture conductivity can be further optimized. The schedule parameters can be further changed during the treatment, to optimally distribute the pillars along the fracture length. One of possible implementation is shown as follows:

Fracture filled with system of pillars so that there are open channels remain between pillars (see FIG. 6). The distance between pillars edges L is smaller than $L_0$—distance on which channels close. Ratio of pillar area to the area of the pointed square (FIG. 6) $S_{pillar}/S_{cell}$ determines ratio of area of propped fracture face to total fracture area. This ratio is related to $T_{prop}/(T_{prop}+T_{clean})$ where $T_{prop}$—time of dirty pulse and $T_{clean}$—time of clean pulse. The conductivity K of the channels between pillars depends on $S_{pillar}/S_{cell}$ and $L/L_0$. On certain parameters the conductivity reaches theoretical maximum $K_{max}$. FIG. 7 illustrates how channel conductivity may depend upon propped fracture area for different ratio $L/L_0$.

In a second example, as the fracturing fluid flows in a wellbore and in a fracture, the proppant slurry slugs may be affected by dispersion due to mixing with clean fluid at interfaces, which can result in increasing proppant slug volume and reduced proppant concentration in the slug. The degree of slug dispersion at entrance into formation (perforation clusters), depending on proppant concentration in the slugs and the slug volume on surface can be optimized to provide the required pulse parameters. The degree of slug dispersion can be determined from surface and downhole measurements of pressure, fluid density and/or other parameters, known to those skilled in the art.

In a third example, early proppant stages in hydraulic fracturing treatments are designed with low proppant concentration to avoid screen-out. These stages intended to place proppant close to the tip of the fracture, where hydraulic width is small. In the case of HPP achieved by pulsations, channels in the tip area may have higher likelihood of closure, significantly affecting the fracture conductivity and the effective fracture length. To reduce the risk of losing conductivity in the tip, the pulses of proppant slurry with different proppant concentration may be pumped. The closed channels in this case may remain propped, providing conductivity of homogeneous proppant pack. It is also possible to pump proppant continuously without pulses in the beginning of the treatment to prop the tip area and then switch to the optimized pulsed pumping schedule.

In a fourth example, highly deviated or essentially horizontal wells with multistage completion multiple fractures can be initiated during a single treatment. The fracturing fluid and proppant slurry may be distributed between open fractures in some ratios. The number of opened fractures (perforation clusters, accepting fluid) can be determined by methods, known from the art. This number can be an important parameter for the pulsing schedule design. Depending on the number of fractures the clean fluid pulse duration can be tuned so to provide an optimal average distance between pillars in all fractures. Since the number of fractures can change during the treatment (screen-out in some of fractures and/or new fracture opening) the pulsing schedule can be adjusted in the real time.

In a fifth example, the practice of hydraulic fracturing involves pumping stages with gradually increasing proppant concentrations. This is done to reduce the risk of premature screen-out, as higher proppant concentration increases fracture conductivity but can also lead to proppant bridging in the fracture. On the other hand pumping of only part of proppant slurry pulses with higher concentration in particular stage can increase fracture conductivity without considerable increase of screen out probability. The non-limiting example is during the 3 PPA stage pumping of every third slurry pulse with 4 PPA proppant concentration. In this case inside the fracture higher concentrated, thus thicker, pillars will be surrounded by thinner ones. This approach may allow further increase of fracture conductivity and effective length with reduced risk of premature screen-out. Furthermore, some of pulses can be designed with lower concentration, e.g. at the same 3 PPA stage, as in the previous example, every second pulse can be designed at 2 PPA. The frequency of lower proppant concentration slurry pulses and the value of proppant concentration can be designed to provide open channels inside the fracture. In this case fracture may have enough conductivity for high hydrocarbons production but with less proppant used.

Some other embodiments are methods of creating of a heterogeneous proppant pack in a hydraulic fracture for the case of horizontal well applications and therefore a creation of a network of the conductive open channels available for fluid flow. Hydraulic fractures covered by such a heterogeneous proppant pack may have an essentially higher conductivity than conventional (uniformly propped) fractures and therefore may increase the oil and gas production rate.

Figure 9:
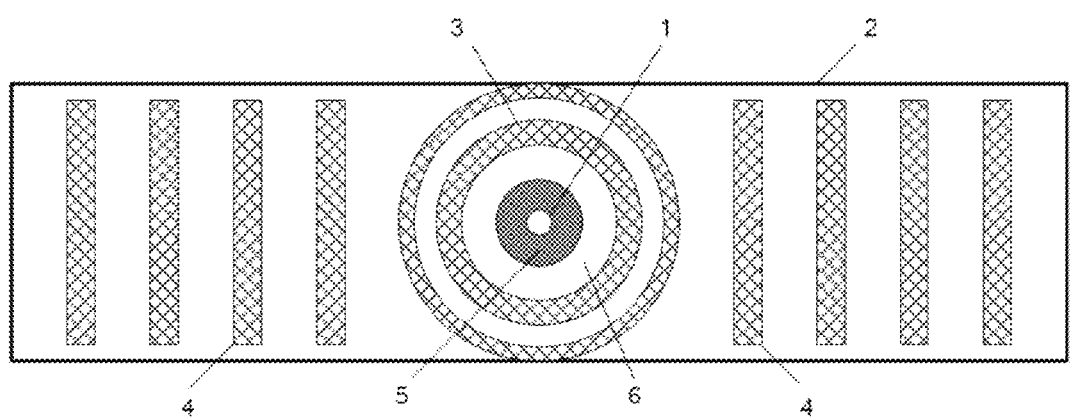
FIG. 9 describes the schematic model representing proppant transport in a horizontal well. Notations: 1—wellbore, 2—boundaries of the hydraulic fracture (transverse, located between stress barriers with confined height growth), 3—proppant pulses transported radial in the central part of the fracture, 4—proppant pulses transported horizontally in the wings of the fracture, 5—proppant pack close to the near-wellbore area, 6—area of potential pinching, if the proppant pack notated by 5 is placed incorrectly.

In such embodiments, the method for forming of a heterogeneous proppant packs in the fracture is based on the alternate injection of a fracturing fluid and fracturing fluid loaded with proppant into the fracture. With such technique it may be important to optimally design the duration of the alternating stages, and furthermore, introduce the homogeneous pack nearer to the wellbore to prevent the fracture pinching. The heterogeneous proppant placement in horizontal applications hence comprises the following stages:

1) The first stage is injection of a fracturing fluid and formation/propagation of a fracture. The fluid injected at this stage (pad stage) typically has no propping agent or low concentration of small size proppant as loss prevention agent, or proppant slugs to clean up and erode the perforations, or proppant to cover parts of the fracture close to the tip.
2) The second stage comprises repetitive addition of given volumes of the proppant to the fracturing fluid. The given volume of the proppant, mixed with the fracturing fluid (at given proppant concentration) is called a proppant pulse (or sub-stage). The volume or duration of a proppant pulse is important parameter and it has essential influence on desired properties of the final fracture. In order to achieve an essential conductivity increase, in some cases, the time of single slug pumping (on surface) can be less than 60 sec at the usual pumping rates, and corresponding volume may be less than 80 bbl. Durations between injected proppant pulses also may be controlling parameters, and, in some examples, are less than 60 sec or in terms of volume, not exceed 80 bbl. The number of the proppant pulses injected in the second stage may be high enough, and may also depend on the size of the fracturing treatment and designed geometry of the fracture. At the same time, to achieve the desired fracture conductivity, the number of the proppant pulses injected in the second stage may typically exceed 1, 2, 3, or even 4 pulses.
3) The third stage (tail-in stage) is the injection of a given volume of the fracturing fluid with proppant into the fracture. The proppant injected in this stage forms the stable proppant pack close to the wellbore to prevent formation walls to close in the near-wellbore zone. The duration of this stage is a controlling parameter, which depends upon the mechanical formation properties and parameters of the treatment. A very short "tail-in" stage may result in the pinching between itself the nearest proppant pulse, pumped in stage 2 (see FIG. 9, notation #6). At the same time, the homogeneous proppant pack located close to the wellbore may compromise the production, as the conductivity of this area can be significantly lower than the conductivity of the channeled part. Hence, the duration of this stage is limited from the upper end by production requirement. Summarizing, the pumping time of the third stage should typically exceed 6 sec (or in terms of volumes it should exceed 3 bbl). At the same time it may be optimum to not exceed the total pumping time or the injected volume of the stage two (standard duration pulse).

Methods described hereinabove may be also applicable to simultaneous stimulation of multiple fractures which may occur in the cases of open-hole completion and cased-hole with multiple perforation clusters. The volumes of the stages specified above are specified per one fracture. Hence, the on-surface pumping schedule may optimally be modified, and stage volumes be multiplied by expected number of fractures generated by the given treatment.

During hydraulic fracturing, high pressure pumps on the surface inject the fracturing fluid into a wellbore adjacent to the face or pay zone of a geologic formation. The first stage, also referred to as the "pad stage" (referred to above) involves injecting a fracturing fluid into a borehole at a sufficiently high flow rate and pressure sufficient to literally break or fracture a portion of surrounding strata at the sand face. The pad stage is pumped until the fracture has sufficient dimensions to accommodate the subsequent slurry pumped in the proppant stage. The volume of the pad can be designed by those knowledgeable in the art of fracture design, for example, as described in Reservoir Stimulation, 3rd Ed., M. J. Economides, K. G. Nolte, Editors, John Wiley and Sons, New York, 2000.

Water-based fracturing fluids are common, with natural or synthetic water-soluble polymers optionally added to increase fluid viscosity, and can be used throughout the pad and subsequent proppant and/or extrametrical material stages. These polymers include, but are not limited to, guar gums; high-molecular-weight polysaccharides composed of mannose and galactose sugars; or guar derivatives, such as hydroxypropyl guar, carboxymethyl guar, carboxymethyl-hydroxypropyl guar, and the like. Cross-linking agents based on boron, titanium, zirconium or aluminum complexes are typically used to increase the effective molecular weight of the polymer for use in high-temperature wells.

To a small extent, cellulose derivatives, such as hydroxyethylcellulose or hydroxypropylcellulose and carboxymethylhydroxyethylcellulose, are used with or without cross-linkers. Two biopolymers—xanthan and scleroglucan—provide excellent proppant suspension, but are more expensive than guar derivatives and so are used less frequently. Polyacrylamide and polyacrylate polymers and copolymers are typically used for high-temperature applications or as friction reducers at low concentrations for all temperatures ranges.

Water-based fracturing fluids can also be obtained using viscoelastic surfactants. Usually, these fluids are prepared by mixing in appropriate amounts of suitable surfactants, such as anionic, cationic, nonionic, amphoteric, and zwitterionic. The viscosity of viscoelastic surfactant fluids are attributed to the three-dimensional structure formed by the fluid's components. When the surfactant concentration in a viscoelastic fluid significantly exceeds a critical concentration, and in most cases in the presence of an electrolyte, surfactant molecules aggregate into species, such as worm-like or rod-like micelles, which can interact to form a network exhibiting viscous and elastic behavior. Also, polymer-free clay-based fluids, for example those based on Laponite® (synthetic clay viscosifier) may be useful as well.

After the fracture is induced, proppant and extrametrical material can be injected into the fracture as a slurry or suspension of particles in the fracturing fluid during what is referred to herein as the "proppant stage." In the proppant stage, proppant and extrametrical material can be injected in one or more segregated substages alternated between a "proppant substage" and a "extrametrical material substage," and/or as a mixture of extrametrical material and proppant in one or more substages referred to herein as a "mixed substage." Further, the proppant, extrametrical material and/or mixed substages can be separated by one or more optional "carrier substages", which are substantially free of proppant and extrametrical material and can also be substantially free of other particles.

Some embodiments may benefit processes that are related to hydraulic fracturing. Examples of these embodiments include enhanced oil recovery, treatments for waste disposal wells for injecting a storing carbon dioxide, waste water or other liquid waste, and treatments for wells for environmental remediation i.e. to inject water to modify the direction or speed of groundwater flow or injection of a chemical to clean a polluted aquifer. Some embodiments may benefit from using seawater or production water with solids.

As a result, the proppant does not completely fill the fracture. Rather, spaced proppant clusters form as pillars with proppant-spacing extrametrical material initially filling the channels between them, through which, upon subsequent removal of the extrametrical material, formation fluids pass. The volumes of proppant, extrametrical material and carrier sub-stages as pumped can be different. That is, the volume of the extrametrical material and any carrier substages can be larger or smaller than the volume of the proppant and/or any mixed substages. Furthermore, the volumes and order of injection of these substages can change over the duration of the proppant stage. That is, proppant substages pumped early in the treatment can be of a smaller volume then a proppant substage pumped later in the treatment. The relative volume of the substages can be selected by the engineer based on how much of the surface area of the fracture it is desired to be supported by the clusters of proppant, and how much of the fracture area is desired as open channels through which formation fluids are free to flow.

Suitable proppants can include sand, gravel, glass beads, ceramics, bauxites, mica, glass, and the like or combinations thereof. Also other proppants like, plastic beads such as styrene divinylbenzene, and particulate metals may be used. Proppant used in this application may not necessarily require the same permeability properties as typically required in conventional treatments because the overall fracture permeability will at least partially develop from formation of channels. Other proppants may be materials such as drill cuttings that are circulated out of the well. Also, naturally occurring particulate materials may be used as proppants, including, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc, some nonlimiting examples of which are proppants made of walnut hulls impregnated and encapsulated with resins. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981. Resin coated (various resin and plastic coatings) or encapsulated proppants having a base of any of the previously listed propping materials such as sand, ceramics, bauxite, nut shells, etc. may be used in accordance with the invention. Essentially, the proppant can be any material that will hold open the propped portion of the fracture.

The selection of proppant can balance the factors of proppant long-term strength, proppant distribution characteristics and proppant cost. The proppant can have the ability to flow deeply into the hydraulic fracture and form spaced pillars that resist crushing upon being subjected to the fracture closure stress. Relatively inexpensive, low-strength materials, such as sand, can be used for hydraulic fracturing of formations with small internal stresses. Materials of greater cost, such as ceramics, bauxites and others, can be used in formations with higher internal stresses. Further, the chemical interaction between produced fluids and proppants, which can significantly change the characteristics of the proppant, can be considered.

Because one embodiment may not rely on the porosity or permeability of the packed proppant matrix to impart flow conductivity to the fracture, the availability of the option to select a wider range of proppant materials can be an advantage of the present invention. For example, proppant can have any size or range of mixed, variable diameters or other properties that yield a high-density, high-strength pillar, which can form a proppant matrix that has high or low porosity and high or low permeability—proppant porosity and permeability are not so important in an embodiment of this invention—because fluid production through the proppant matrix is not required. Or, an adhesive or reinforcing material that would plug a conventional proppant pack can be employed in the interstitial spaces of the proppant matrix herein, such as, for example, a settable or crosslinkable polymer which can be set or crosslinked in the proppant.

Thus, a proppant pillar of suitable strength can be successfully created using sand with particles too weak for use in conventional hydraulic fracturing. Sand costs substantially less than ceramic proppant. Additionally, destruction of sand particles during application of the fracture closure load can improve strength behavior of the same cluster consisting of proppant granules. This can occur because the cracking/destruction of proppant particles decreases the cluster porosity thereby compacting the proppant. Sand pumped into the fracture to create proppant clusters does not need good granulometric properties, that is, the narrow particle size or diameter distribution required for a permeable proppant pack in conventional fracturing. For example, in one embodiment, it is possible to use 50 tons of sand, wherein 10 to 15 tons have a diameter of particles from 0.002 to 0.1 mm, 15 to 30 tons have a diameter of particles from 0.2 to 0.6 mm, and 10 to 15 tons have a diameter of particles from 0.005 to 0.05 mm. It should be noted that conventional hydraulic fracturing would require about 100 tons of a proppant more expensive than sand to obtain a similar value of hydraulic conductivity for fluid passage through the continuous-porosity proppant matrix in the propped fracture.

For the purposes of this invention, one embodiment of the proppant can use sand with an adhesive coating alone, or an adhesive coating coated by a layer of non-adhesive substance dissolvable in the fracture as the fracture treatment fluid or another fluid it passes through the fracture. A non-adhesive substance inhibits the formation of proppant agglomerates prior to entering the fracture, and allows for control of a time moment in the fracture when, corresponding to a place where, a proppant particle gains its adhesive properties. The adhesive coating can be cured at the formation temperature, and sand particles conglutinate between each other. Bonding particles within the pillars can inhibit erosion of the proppant pillar as formation fluids flow past, and minimizes ultimate proppant island destruction by erosion.

In one embodiment, reinforcing and/or consolidating material can be introduced into the fracture fluid to increase the strength of the proppant clusters formed and prevent their collapse during fracture closure. Typically the reinforcement material can be added to the proppant substage and/or the mixed substage, but could also be introduced additionally or alternatively in the extrametrical material substage and/or the carrier substage, or in other ways. For example, the reinforcement material can be an extrametrical material that serves to reinforce the proppant clusters, but can be removed as or with the extrametrical material from the proppant-lean regions. The concentrations of both proppant and the reinforcing materials can vary in time throughout the proppant stage, and from substage to substage. That is, the concentration of proppant reinforcing material can be different at two subsequent substages. It can also be suitable in some applications of the present method to introduce the reinforcing material in a continuous or semi-continuous fashion throughout the proppant stage, during a plurality of adjacent carrier, extrametrical material, mixed and proppant substages. For example, the reinforcing material deposited in the extrametrical material regions in the fracture can be removed with the extrametrical material as described below. In any case, introduction of the reinforcing material need not be limited only to the proppant substage. Particularly, different implementations can be preferable when the concentration of the reinforcing material does not vary during the entire proppant stage; monotonically increases during the proppant stage; or monotonically decreases during the proppant stage.

Curable or partially curable, resin-coated proppant can be used as reinforcing and consolidating material to form proppant clusters. The selection process of the appropriate resin-coated proppant for a particular bottom hole static temperature (BHST), and the particular fracturing fluid are well known to experienced workers. In addition, organic and/or inorganic extrametrical materials can reinforce the proppant cluster. These materials can be used in combination with resin-coated proppants or separately. These extrametrical materials can have an inherently adhesive surface, can be chemically or physically modified to have an adhesive coating, or can have an adhesive coating resulting from a layer of non-adhesive substance dissolvable in the fracture by a fluid simultaneously or subsequently passed through the fracture. Extrametrical materials made of adhesive material can be used as reinforcing material, coated by a non-adhesive substance that dissolves in the fracturing fluid or another fluid as it is passed through the fracture at the subterranean temperatures. Metallic particles are another embodiment for reinforcing material and can be produced using aluminum, steel optionally containing special additives that inhibit corrosion, and other metals and alloys, and the like. The metallic particles can be shaped to resemble a sphere and measure 0.1-4 mm, for example. In one embodiment, metallic particles can have an elongated shape with a length longer than 2 mm and a diameter of 10 to 200 microns. In another embodiment, plates of organic or inorganic substances, ceramics, metals or metal-based alloys can be used as reinforcing material in the proppant. These plates can be disk or rectangle-shaped and of a length and width such that for all materials the ratio between any two of the three dimensions is greater than 5 to 1.

On the other hand, a high permeability and/or high porosity proppant pack can be suitably employed without detriment. In one embodiment, the permeability of the proppant can provide some limited fracture conductivity in the event the channels are not properly formed or do not fully interconnect. Additionally, under some formation conditions it can be advantageous when using the present method to perform a final tail-in stage of the fracturing treatment involving continuous proppant introduction into the fracturing fluid, with the proppant at this stage consisting essentially of uniform particle size to obtain a zone of continuous-porosity proppant adjacent to the wellbore. If employed, the tail-in stage of the fracturing treatment resembles a conventional fracturing treatment, where a continuous bed of well-sorted conventional proppant is placed in the fracture relatively near to the wellbore. The tail-in stage can involve introduction of both an agent that increases the proppant transport capability of the treatment fluid and/or an agent that acts as a reinforcing material. The tail-in stage is distinguished from the second stage by the continuous placement of a well-sorted proppant, that is, a proppant with an essentially uniform particle size, or even rod-shaped proppant. The proppant strength is sufficient to prevent its cracking (crumbling) when subjected to stresses that occur at fracture closure. The role of the proppant at this tail stage is to prevent fracture closure and, therefore, to provide good fracture conductivity in proximity to the wellbore.

The proppants useful in the present method must also be capable of being segregated into proppant-rich islands for heterogeneous placement in the fracture spaced away from adjacent proppant islands. Properties such as density, size, shape, magnetic characteristics, surface characteristics, for example, hydroaffinity and reactivity, and chemical or mechanical interaction with the extrametrical material, and the like, can all influence the segregability of the proppant. Therefore, these characteristics can be selected to facilitate segregation from the extrametrical material-rich regions depending on the manner in which segregation is effected, downhole conditions, the extrametrical material, the treatment fluid, etc.

In an embodiment, the proppant can have a self-adherent surface, for example, by using a proppant that has a natural attraction for or a tendency to agglomerate with or adhere to other proppant particles, and/or by coating or chemically modifying the surface of the proppant for self-adhesion, e.g. by coating the proppant with an adhesive or tackifier, or grafting an adhesive or tackifying compound to the proppant. Preferably, the self-adherent proppant is non-adherent to the extrametrical material and other surfaces such as the surface piping, pumps and wellbore tubing. In one version of the self-adherent proppant, the proppant is loosely held together in cohesive slugs or globules of a gel or lightly crosslinked, flowable polymer for which the proppant has a differential affinity, e.g. the proppant can be grafted to the gel-forming polymer.

In one embodiment, the proppant can be hydrophilic, for example, by using a proppant that is normally hydrophilic, such as most sand, for example, and/or by treating the proppant particles with ionic or polar modifiers such as a strong acid, weak acid, strong base, weak base, or reacting the surface of the proppant to associate an ionic or polar moiety with an affinity to aqueous liquids. In this manner, the proppant can be differentially attracted to other hydrophilic species in the treatment fluid, e.g. other proppant particles or an immiscible fluid phase in the treatment fluid, such as an aqueous phase, especially where the extrametrical material is hydrophobic and/or introduced via an immiscible hydrophobic fluid phase in the treatment fluid.

In another embodiment, the proppant can be rendered hydrophobic, for example, by using proppant that is normally hydrophobic, such as wax, for example, and/or by treating the proppant particles with an oil, wax or other hydrocarbon, or reacting the surface of the proppant to associate a hydrocarbyl moiety with a low affinity to aqueous liquids. In this manner, the proppant can be differentially attracted to other hydrophobic species in the treatment fluid, e.g. other proppant particles or an immiscible fluid phase in the treatment fluid, such as an oil or other non-aqueous phase, especially where the extrametrical material is hydrophilic and/or introduced via an immiscible hydrophilic fluid phase in the treatment fluid.

In one embodiment the proppant can be present in the treatment fluid that is injected into the fracture in the form of an immiscible fluid packet or globule dispersed in a more or less continuous phase of a second fluid carrying the extrametrical material. The immiscible fluid proppant packets can each contain sufficient proppant to form a suitably sized island, singly from isolated packet placement or in combination with one or more additional proppant packets where cumulative packet placement can occur. Because the open channels to be formed must interconnect between the wellbore and the remote exposed surfaces in the fracture, it can be convenient to provide the extrametrical material in a continuous phase in the treatment fluid in which the proppant packets are a dispersed or discontinuous phase. In one version, the proppant packets can be provided with a thin encapsulating skin or deformable bladder to retain the proppant and remain flowable during injection, and the bladder can be optionally ruptured or chemically or thermally removed during placement in the fracture and/or during closure of the fracture.

The choice of extrametrical material can depend on the mode of extrametrical material segregation and placement in the fracture, as well as the mode of extrametrical material removal and channel formation. In its simplest form, the extrametrical material can be a solid particulate that can be maintained in its solid form during injection and fracture closure, and readily dissolved or degraded for removal. Materials that can be used can be organic, inorganic, glass, ceramic, nylon, carbon, metallic, and so on. Suitable materials can include water- or hydrocarbon-soluble solids such as, for example, salt, calcium carbonate, wax, or the like. Polymers can be used in another embodiment, including polymers such as polylactic acid (PLA), polyglycolic acid (PGA), polyol, polyethylene terephthalate (PET), polysaccharide, wax, salt, calcium carbonate, benzoic acid, naphthalene based materials, magnesium oxide, sodium bicarbonate, soluble resins, sodium chloride, calcium chloride, ammonium sulfate, and the like, and so on, or any combinations thereof. As used herein, "polymers" includes both homopolymers and copolymers of the indicated monomer with one or more comonomers, including graft, block and random copolymers. The polymers can be linear, branched, star, crosslinked, derivitized, and so on, as desired. The extrametrical material can be selected to have a size and shape similar or dissimilar to the size and shape of the proppant particles as needed to facilitate segregation from the proppant. Extrametrical material particle shapes can include, for example, fibers, spheres, rods, platelets, ribbons, and the like and combinations thereof. In some applications, bundles of fibers, or fibrous or deformable materials, can be used. These fibers can additionally or alternatively form a three-dimensional network, reinforcing the proppant and limiting its flowback.

For example, the separation of injected proppant and extrametrical material as introduced and placed in the fracture can be induced by differences (or similarities) in size, density or shape of the two materials. The specific gravities and the volume concentrations of proppant and extrametrical material can be tailored to minimize mixing and homogenization during placement. Properly sizing the extrametrical material or adding various weighting agents to the extrametrical material-rich fluid can facilitate segregation at the appropriate time and location.

Either the proppant or the proppant-spacing particles can also be made to be "sticky", so particles of similar material adhere to one another, helping ensure heterogeneity between the two dissimilar materials. Proppant particles can be selected that adhere to other proppant particles as discussed above and to be repelled by or repel the extrametrical material particles. Alternatively, or additionally, extrametrical material particles can be selected that are self-adherent and non-adherent to the proppant. The extrametrical material can, for example, include a self-adherent coating. Another technique to encourage separation of the two materials is selecting proppant and extrametrical material with inherent hydroaffinity differences, or creating surface hydroaffinity differences by treating either the proppant or the extrametrical material with hydrophobic or hydrophilic coatings.

The presence of the extrametrical material in the fracturing fluid in the proppant stage, e.g. in a mixed substage or in a segregated extrametrical material substage, can have the benefit of increasing the proppant transport capability. In other words, the extrametrical material can reduce the settling rate of proppant in the fracture treatment fluid. The extrametrical material can in an embodiment be a material with elongated particles having a length that much exceeds a diameter. This material can affect the rheological properties and suppress convection in the fluid, which can result in a decrease of the proppant settling rate in the fracture fluid and maintain segregation of the proppant from proppant lean regions. The extrametrical material can be capable of decomposing in the water-based fracturing fluid or in the downhole fluid, such as fibers made on the basis of polylactic acid (PLA), polyglycolic acid (PGA), polyvinyl alcohol (PVOH), and others. The fibers can be made of or coated by a material that becomes adhesive at subterranean formation temperatures. They can be made of adhesive material coated by a non-adhesive substance that dissolves in the fracturing fluid or another fluid as it is passed through the fracture. The fibers used in one embodiment can be up to 2 mm long with a diameter of 10-200 microns, in accordance with the main condition that the ratio between any two of the three dimensions be greater than 5 to 1. In another embodiment, the fibers can have a length greater than 1 mm, such as, for example, 1-30 mm, 2-25 mm or 3-18 mm, e.g. about 6 mm; and they can have a diameter of 5-100 microns and/or a denier of about 0.1-20, preferably about 0.15-6. These fibers are desired to facilitate proppant carrying capability of the treatment fluid with reduced levels of fluid viscosifying polymers or surfactants. Fiber cross-sections need not be circular and fibers need not be straight. If fibrillated fibers are used, the diameters of the individual fibrils can be much smaller than the aforementioned fiber diameters.

The concentration of the extrametrical material in the treatment fluid can conveniently be such that the extrametrical material compressed between the proppant islands by fracture closure has a packed volume to fill the spaces between the packed proppant islands with similar stress in both the proppant and extrametrical material. In other words, the extrametrical material fill serves to hold the proppant islands in place and inhibit lateral expansion that would otherwise reduce the ultimate height of the proppant pillar. The weight concentration of the fibrous extrametrical material in the fracturing fluid can be from 0.1 to 10 percent in one embodiment. The concentration of the solid extrametrical material in the treatment fluid in another embodiment is typically from about 0.6 g/L (about 5 ppt) to about 9.6 g/L (about 80 ppt).

In an embodiment, a first type of fiber additive can provide reinforcement and consolidation of the proppant. This fiber type can include, for example, glass, ceramics, carbon and carbon-based compounds, metals and metallic alloys, and the like and combinations thereof, as a material that is packed in the proppant to strengthen the proppant pillars. In other applications, a second type of fiber can be used that inhibits settling of the proppant in the treatment fluid. The second fiber type can include, for example, polylactic acid, polyglycolic acid, polyethylene terephthalate (PET), polyol, nylon, and the like and combinations thereof, as a material that inhibits settling or dispersion of the proppant in the treatment fluid and serves as a primary removable fill material in the spaces between the pillars. Yet other applications include a mixture of the first and second fiber types, the first fiber type providing reinforcement and consolidation of the proppant and the second fiber type inhibiting settling of the proppant in the treatment fluid.

The fibers can be hydrophilic or hydrophobic in nature. Hydrophilic fibers are used in one embodiment. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like.

In some embodiments, the solid extrametrical material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. Some examples are polyglycolic acid or PGA, and polylactic acid or PLA. These materials function as solid-acid precursors, and upon dissolution in the fracture, can form acid species which can have secondary functions in the fracture.

If desired, a pH control agent can be used in the treatment fluid, especially where a solid acid precursor is present and one or more of the other treatment fluids is pH-sensitive. The pH control agent can be selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

For example, the extrametrical material can function as an acid breaker for a viscosifying agent, where the extrametrical material is selected from a solid that contains an acid and that hydrolyzes to release an acid, a solid that hydrolyzes to release an acid, and mixtures of such materials. The solid can be present in particles sufficiently small that they at least partially enter pores of the formation, and/or sufficiently large that they remain in the fracture in the spaces between the proppant pillars. The treatment fluid can also contain a pH control agent present in an amount sufficient to neutralize any acid present in the solid material before the injection and to neutralize any acid generated by the solid material during the injection, so that the acid breaker is not available to break the fluid during the injection. When the injection is stopped, the solid is allowed to release acid in excess of the amount that can be neutralized by any pH control agent, thereby breaking the viscous fluid. Optionally, the viscosifying agent in this embodiment is a viscoelastic surfactant system. Optionally, the solid material is of a size that forms an internal filter cake in the pores of the formation. Optionally, the solid material is of a size that does not block the flow of fluid in the pores of the formation. The solid material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. An example is polyglycolic acid. The pH control agent is selected from amines and alkaline earth, ammonium and alkali metal salts of sesquicarbonates, carbonates, oxalates, hydroxides, oxides, bicarbonates, and organic carboxylates, for example sodium sesquicarbonate, triethanolamine, or tetraethylenepentamine.

Suitable solid acids for use in viscoelastic surfactant (VES) fluid systems include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Other materials suitable for use in VES fluid systems are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355. Suitable solid acids are also described in U.S. Patent Application Publication Nos. 2003/002195 and 2004/0152601, both of which are assigned to the assignee of the present application.

Excellent solid acid components for VES systems are solid cyclic dimers, or solid polymers, of certain organic acids, that hydrolyze under known and controllable conditions of temperature, time and pH to form organic acids. One example, a suitable solid acid is the solid cyclic dimer of lactic acid known as "lactide", which has a melting point of 95 to 125° C. depending upon the optical activity. Another is a polymer of lactic acid, sometimes called a polylactic acid or "PLA", or a polylactate, or a polylactide. Another example is the solid cyclic dimer of glycolic acid known as "glycolide", which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. The as-received materials can contain some free acid and some solvent, typically water.

Natureworks L.L.C., Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity can be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers of PGA and PLA can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze; it is to be understood that the terms hydrolyze or hydrolysis, etc., are intended to include dissolution.

The solid acids can be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acids by any means can facilitate segregation from hydrophilic proppant and can delay the hydrolysis for injection and fracture. Note that coating here can refer to encapsulation or simply to changing the surface by chemical reaction or by forming or adding a thin film of another material. Another suitable method of delaying the hydrolysis of the solid acid, and the release of acid, is to suspend the solid acid, optionally with a hydrophobic coating, in an oil or in the oil phase of an emulsion. The hydrolysis and acid release do not occur until water contacts the solid acid.

The VES self-destructs in situ, that is, in the location where it is placed. That location can be part of a suspension in a treatment fluid in the wellbore, in perforations, in a gravel pack, or in a fracture; or as a component of a filter cake on the walls of a wellbore or of a fracture; or in the pores of a formation itself. The VES can be used in formations of any lithology but are used most commonly in carbonates or sandstones.

A particular advantage of these materials is that the solid acid precursors and the generated acids are non-toxic and are biodegradable. The solid acids are often used as self-dissolving sutures in medical practice, for example.

A polyol is a polyhydric alcohol, i.e., one containing three or more hydroxyl groups. One embodiment of a polyol useful as a extrametrical material is a polymeric polyol solubilizable upon heating, desalination or a combination thereof, and which consists essentially of hydroxyl-substituted carbon atoms, in a polymer chain, spaced from adjacent hydroxyl-substituted carbon atoms by at least one carbon atom in the polymer chain. In other words, the useful polyols are preferably essentially free of adjacent hydroxyl substituents. In one embodiment, the polyol has a weight average molecular weight greater than 5000 up to 500,000 or more, and from 10,000 to 200,000 in another embodiment. The polyol can if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyol can also be modified to include carboxylic acid, thiol, paraffin, silane, sulfuric acid, acetoacetylate, polyethylene oxide, or quaternary amine or other cationic monomers. Such modifications have several affects on the properties of the polyol; affects on solubility, sensitivity to salinity, pH, and crosslinking functionalities (e.g. hydroxyl groups and silanol groups which are chelates that can crosslink with common crosslinkers) are of most interest to the present invention. All of said modifications are commercially available products.

In one embodiment, the polyol is a substituted or unsubstituted polyvinyl alcohol that can be prepared by at least partial hydrolysis of a precursor polyvinyl compound having ester substituents, such as, for example, polyvinyl acetate, polyvinyl propanoate, polyvinyl butanoate, polyvinyl pentanoate, polyvinyl hexanoate, polyvinyl 2-methyl butanoate, polyvinyl 3-ethylpentanoate, polyvinyl 3-ethylhexanoate, and the like, and combinations thereof. When the polyol comprises polyvinyl alcohol prepared by at least partial hydrolysis of polyvinyl acetate, the polyol is not generally soluble in salt water, as discussed in more detail below, and further, the polyol is commercially available in the form of partially crystalline fibers that have a relatively sharp trigger temperature below which the fibers are not soluble in water and above which they readily dissolve, also as discussed in more detail below.

Suitable repeating units in the polyols can have the following formulae:

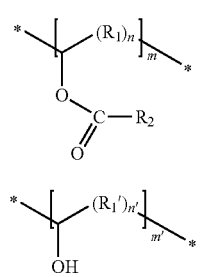

Polymers can contain units 1 and 2 in varying proportions, where $R_1$ and $R_1'$ can be the same or different but are usually the same. In the structures, $R_1$ or $R_1'$ is an alkyl chain that can be saturated or unsaturated, linear or branched, containing 1 to 5 carbon atoms, where n and n'=1 to 5, and where n and n' can be equal or different, but preferably equal. $R_2$ is an alkyl chain that can be saturated or unsaturated, aliphatic or aromatic, linear or branched, from 0 carbons (i.e. hydrogen) to 12 carbons. In the formulae above, m=0 to 5,000 and m'=100 to 10,000. The units 1 and 2 can be alternating, random or block in configuration.

From the above general description, polymers can be defined by changing parameters. For example, polyvinyl alcohol 99.99% hydrolysis with MW of ~5000 would be: m=0, R1'=$CH_2$, n'=l, m'=100. Polyvinyl alcohol with 90% hydrolysis and MW of ~5000 and derived from polyvinyl acetate would be: m=~10, n=n'=1, R1=R1'=$CH_2$, R2=$CH_3$, m'=~90.

For the purpose of illustration only, the invention is described hereafter with reference to polyvinyl alcohol (PVOH) as one example of a suitable polyol extrametrical material. Those skilled in the art will appreciate that the present invention is not limited to PVOH and is equally applicable to polyols that meet the above-stated requirement of having alterable solubility modes in the context of well treatment fluids and heterogeneous proppant placement methodology described herein.

A particular advantage of PVOH is that it is non-toxic and is biodegradable. For example, PVOH is commonly found in the medical industry and fiber forms are commonly used in clothing or fabrics that are intended to dissolve when washed in warm or hot water.

PVOH is a solid material that is manufactured in many forms, such as, for example, fibers, sheets, granules, beads, powder, and the like. PVOH is a synthetic polymer that is water soluble and generally unaffected by petroleum hydrocarbons. The polymer comprises a carbon chain backbone with hydroxyl and acetate groups. According to Kirk et al., *Encyclopedia of Chemical Technology, 3rd Edition,* Vol. 23, John Wiley and Sons, pp. 848-865 (1983), PVOH can be produced by the hydrolysis of polyvinyl acetate in methanol catalyzed by a base according to the following equation:

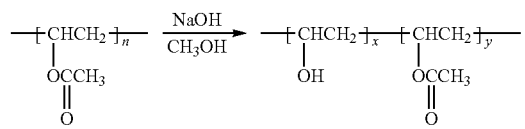

PVOH can generally exist in three different aggregation states, which are controlled by solution conditions. In its solid state, PVOH is semi-crystalline. The degree of crystallinity varies from one mode of manufacture to another and with the degree of hydrolysis and grade of the PVOH. In aqueous solution, PVOH can lose crystallinity and swell to form an amorphous structure, which is flexible and malleable, but not yet solubilized. Depending on solution conditions, PVOH can solubilize completely and exist as polymer stands in solution.

The present invention can use PVOH in an insoluble form to place the PVOH extrametrical material downhole in the fracture. By changing the salinity and/or temperature conditions adjacent the PVOH deposited in the fracture, the PVOH can be solubilized to remove the PVOH deposits and/or to activate the PVOH for use as a breaker or other downhole function. In addition to the channel-filling material, any PVOH filter cake can thus also be removed. The PVOH can also be employed as a fiber for fiber assisted transport of the proppant, for example. Solubilized PVOH can also function as a delayed breaker for crosslinked polymer or viscoelastic surfactant (VES fluid systems), for example.

The method can exploit the controllability of the solubility of PVOH and similar polyols in aqueous media by the fluid salt content. In a brine of sufficiently high salt concentration, PVOH is insoluble but will become a sticky, flexible material that readily bonds to itself and to solid surfaces, an excellent channel filler material. By dropping the brine concentration below a critical salt level, however, the self-adherent PVOH solids can become soluble and rapidly dissolve into solution.

Dissolution of PVOH is controlled by the degree of hydrolysis of the PVOH, molecular weight, crystallinity, particle size, and the like. The degree of hydrolysis is defined as the mole percent of hydroxyl groups on the polymer chain in relation to the non-hydrolyzed acetate groups. For example, PVOH with a degree of hydrolysis of 88 would have 88 mole percent hydroxyl groups and 12 mole percent acetate groups along the polymer backbone. The hydroxyl and/or acetate groups can be distributed randomly or in blocks.

Most PVOH grades dissolve at around 80° C. (176° F.). A degree of hydrolysis of about 88% is optimum for solubility, i.e. the solubility of the PVOH decreases when the degree of hydrolysis is more or less than about 88%. As the degree of hydrolysis increases above 88%, solubility decreases due to a tighter alignment of the hydroxyl moieties which is thought to result from a form of hydrogen bonding. Below 88% hydrolysis, solubility decreases due to the increased number of acetate groups; polyvinyl acetate is generally insoluble in water. Other factors affecting PVOH solubility can include polymer concentration and salt concentration; the amount of unsolubilized PVOH, e.g. amorphous PVOH, can increase with increased concentrations of salt or polymer. The crystallinity of the PVOH can also be used to control the temperature at which the PVOH will dissolve. For example, PVOH's that are partially crystalline to varying extents can be soluble in water at temperatures ranging from 20° C. to 90° C. As part of the dissolution process PVOH goes through a "glue like" or amorphous state. The solubility and the glue state of PVOH polymer can also be controlled through salt concentration. For example, a PVOH fiber that completely dissolves in 2 wt % KCl brine at 80° C. (176° F.), may not completely dissolve below 93° C. (200° F.) in 6% KCl brine, may only deform and clump at 93° C. (200° F.) in 10% KCl brine, and may not be affected at all at 93° C. (200° F.) in 12% KCl brine.

The conditions and rate of dissolution of PVOH, having a particular chemical and physical make-up, including crystallinity, degree of hydrolysis, molecular weight and distribution, a coating if present, at a particular temperature and in contact with a fluid or fluids of a particular salinity, is readily determined by a simple experiment: exposing the PVOH to the fluid or fluids under treatment conditions and monitoring the solubilization.

The PVOH can be manufactured and used in various solid shapes, including, but not limited to fibers, powders, granules, and the like. The system comprising a well treatment fluid and PVOH (and any other additives) can be batch-mixed or mixed on-the-fly using otherwise conventional treatment fluid mixing equipment and mixing techniques.

If the PVOH is in crystalline fiber form that is used primarily below its trigger temperature for placement and does not swell or become amorphous until just before downhole solubilization, then most commonly, straight fibers are used; however, curved, crimped, spiral-shaped and other three dimensional fiber geometries are useful. Also, the fibers can be bundled together, or hoed on one or both ends. In one embodiment, the fiber length is at least about 2 millimeters, and the fiber diameter ranges from about 3 to about 200 microns. There appears to be no upper limit on the length of the fibers employed from the standpoint of utility. Handling, mixing, and pumping equipment dictate the practical upper limit for the length of fibers. Suitable PVOH fibers in one embodiment have a length of about 2-25 mm, preferably about 3-18 mm, most preferably about 6 mm; they have a denier of about 0.1-20, preferably about 0.15-6 Such fibers are optimized for particle transport.

If the PVOH is amorphous or changes from crystalline to amorphous form in the well treatment fluid, the particular physical form is less critical since the PVOH will form a gluelike phase that will disperse as small particles in the treatment fluid. If the PVOH is also to be used as a fluid loss additive, the particle size of the PVOH particles is chosen based primarily on the desired fluid loss properties (e.g. spurt and wall building coefficient). Typical particle sizes for beads or powders range from submicron, for example about 0.2 microns, to about 200 microns, for example from about 10 to about 50 microns, but the actual size depends especially upon the formation properties and on other factors known to those of ordinary skill in the art. Amorphous or partially crystalline PVOH fibers in these size ranges are also suitable.

If the PVOH is to be used also as a breaker, the particles can be of a broad size range, for example from nanoparticles (for breaking a VES within a matrix) to the size of proppants for breaking carrier fluid. The PVOH and its properties, such as molecular weight and crystallinity, are chosen based primarily on the desired rates of dissolution in the carrier fluid to be used at the temperature and salinity at which it will be used. These choices can also be influenced by the desired time before the delayed break, which could depend upon the size of the job, whether the job is hydraulic fracturing or gravel packing, and other factors known to those of ordinary skill in the art, including the concentrations and natures of the VES or crosslinked polymer and any other additives, and the temperature.

Moreover, there can be changes to the parameters during a treatment which are taken into account in the choice of a particular PVOH solid, including its chemistry and crystallinity, its size and shape, and its concentration, among other factors, depending upon the way it will be used as a extrametrical material or otherwise. All of these parameters can be affected by the nature of the job, for example, whether or not fluid loss control is needed, the temperature, the nature of the formation, and the time desired before a break occurs and/or the time desired by which a break has occurred. For example, fluid loss control may not be needed when gravel packing in a low permeability formation and the choices can be made on the basis of breaking properties. Suitable choices can be made with the aid of simple experiments like those described above, or in the examples below, optionally with the aid of simulation software.

When PVOH fibers, for example, are employed they can have a temperature-triggered solubility in water, for example, above 90° C. The trigger temperature should be above the injection temperature, but below the formation temperature. In this manner the PVOH fibers are injected with the treatment fluid as a solid, but become solubilized downhole, after spacing the proppant islands apart for fracture closure, as the temperature increases above the trigger temperature. Solubilization can be delayed by employing PVOH fibers with a trigger temperature just below the formation temperature and/or continued injection of low temperature fluids to maintain the fibers below the trigger temperature until dissolution is desired. Where the solubility of the fibers is controlled by maintaining a sub-trigger temperature, aqueous fluids with low salinity can be employed. Also, the solubilization of the fibers can be controlled or delayed further by using high-salinity fluid so that if the trigger temperature is exceeded, solubilization does not occur until the salinity is reduced. Care should be taken to avoid impairing fluid flow (when fluid flow is a requirement) at a condition where the fibers are not entirely soluble but have become "sticky" so as to clump and block interstitial spaces.

The PVOH fibers can also be used in a proppant stage employing fiber assisted transport to improve proppant and other particle transport while reducing the amount of other fluid viscosifiers required. The at least partially crystalline PVOH fibers can be made to dissolve after the treatment so that no permanent fiber residue is left in the wellbore or fracture. PVOH fibers having temperature triggers at preselected temperatures are available commercially under the trade designation KURALON K-II (Kuraray America, Incorporated), for example. These PVOH fibers completely dissolve in water when brought to a defined trigger temperature, but are virtually insoluble at lower temperature for a broad range of pH and chemical conditions. These PVOH fibers are made to have defined temperature trigger points for aqueous dissolution at desired temperatures between 20° C. and 90° C., in 10° C. increments. When the PVOH fiber does dissolve into an aqueous treatment or reservoir fluid, it releases polyvinyl alcohol in solution. This can effectively break VES fluids. The dissolved fiber can also break some crosslinked guar based or other polymer-viscosified fluids since the addition of dissolved polyvinyl alcohol effectively acts to take borate, titanate, zirconate and similar ions away from the guar based molecules, thereby reducing the viscosity of the crosslinked polymer to that of the linear gel.

Fibers and other particle forms of PVOH are also available in non-crystalline or semicrystalline/amorphous form. When an amorphous PVOH is employed, dissolution of the PVOH can be controlled by salinity alone. The well treatment fluid in which the PVOH particles are introduced should have a high salinity to avoid premature dissolution. When it is desired to dissolve the PVOH solids, salinity conditions are reduced by introducing a subsequent treatment fluid of low salinity, e.g. fresh water or 2% KCl, or where the formation water has a low salinity, allowing the connate water to flow to the environment of the PVOH solids.

The PVOH solids can optionally be coated to slow the dissolution. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the PVOH solids by any means delays the dissolution. Note that coating here can refer to encapsulation or simply to changing the surface by chemical reaction or by forming or adding a thin film of another material. Another suitable method of delaying the dissolution of the PVOH solids is to suspend the solid, optionally with a hydrophobic coating, in an oil or in the oil phase of an emulsion. The dissolution does not occur until low salinity water contacts the solid PVOH above any solubility trigger temperature.

In another embodiment of the invention, the invention relates to a composition contain a subterranean formation penetrated by a wellbore and a fracture within the formation. Within the fracture (i.e. spaces formed between formation faces) is a plurality of proppant clusters proppant spaced apart by a plurality of extrametrical material clusters. The plurality of extrametrical material clusters is removable, by any suitable technique, to form open channels around proppant clusters to enable fluid flow from the formation through the fracture toward the wellbore.

In yet another aspect, method embodiments include injecting a plurality of stages of a well treatment fluid through a wellbore into a fracture in a subterranean formation, the stages of the fluid containing at least one of a proppant and an extrametrical material. The channelant comprises at least one of a solid acid-precursor to generate acid in the fracture, and a solid base-precursor to generate a base in the fracture (in either case, a suitable acid or base is a material which alters the pH of an aqueous median, in either a decreasing or increasing direction, respectively). The proppant is placed in the fracture in a plurality of proppant clusters to form pillars. The channelant then dissolves in the fracture, which may further enable fluid flow from the formation through the fracture toward the wellbore (the term 'dissolve' in the present application means any suitable process, either chemical or mechanical, by which the extrametrical material voids the fracture space occupied).

Some embodiments may benefit from the presence of degradable, high energy materials in fiber or emulsion form. Degradable, high energy (explosive or deflagrable) polymer or organic compound is delivered to the fracture in fiber or emulsion form and initiated to degrade optionally with an explosion, thus leaving the proppant pack clear of fiber. Further, the formation is additionally stimulated. Methane dry gas wells may benefit from such embodiments because of their low permeability (in the range of 10 nD to 5 mD) and their longer fiber degradation time requirements due to lower water or oil flow rates. In some embodiments, the material contains both reducer and oxidizer in the same molecule and does not need active media participation in decomposition. Polymers or low molecular weight products or mixtures thereof may be used. Oxidizing groups within a molecule include nitro, azido, and/or peroxide groups. Materials for fibers include nitrocellulose, nitrostarch, nitro polyvinyl alcohol, nitropolystyrene, nitroindene, nitroethylene, nitro polyurethane, dinitropropyl acrylate, polyvinyl azide, glycidyl azide polymer, and their derivatives and mixtures thereof. Materials for emulsions include nitrocellulose at a different content of nitro groups, nitro polyvinyl alcohol, nitropolystyrene, nitroindene nitroethylene, nitro polyurethane, dinitropropyl acrylate, polyvinyl azide, glycidyl azide polymer, 2,4,6-trinitrotoluene and other nitrobenzene derivative, hexanitrostilbene, and derivatives and mixtures thereof.

High energy containing material processes may benefit from compounds that have both hydrocarbon fragment as a reducer and nitro (or other nitrogen-loaded) fragment as an oxidizer and initiation cause decomposition (no chemical triggers required) ideally with $CO_2$, $N_2$, and $H_2O$ as final products. Fast degradable compounds may be used as solid gas precursor which provides slow or fast gas ceasing. This results in decreased hydrostatic pressure and improved production. As a practical matter, Explosive and deflagrable fiber may be safely delivered to the location in wet or slurry form in water or gel. Three ways may be selected for this degradation.

1. Thermal slow decomposition of the material in bulk, with no decomposition wave propagation. High temperature in downhole conditions drives this. The advantage of this is the quick fiber disappearance and gas release. Decomposition takes about 10 days at 100° C., activation energy is about 27 Kcal/mol.

2. Fast deflagration with wave propagation below the sound speed. This starts after thermal or other type of initiation. The advantage is faster fiber degradation, product gas release, heating up the formation near the fracture, and control of the triggering process.

3. Explosion. This starts after thermal or other (chemical, pressure, irradiation, acoustic wave, etc.) initiation. This degrades fibers and induces fracture stimulation. The advantage is fast fiber degradation, additional formation stimulation, and controlled triggering.

Some embodiments that rely upon high energy fibers may benefit from using a high energy material emulsion to encapsulate other downhole chemicals such as breakers, aids, etc. Hydrophobic ingredients can be admixed to the hydrophobic phase of emulsion that remains stable at the surface. Thus, fast release of encapsulated reagents may be achieved.

High energy material emulsions may include 90 to 10 percent water, 90 to 10 percent degradable high energy material, and optionally organic solvent to dissolve the degradable material, emulsifier, stabilizer, solid additives, encapsulated materials, and breaker aids. In downhole conditions, the emulsion is triggered for high energy material (internal phase) precipitation from the emulsion. Triggering happens under action of downhole temperature, chemical destabilizing of emulsion droplets, extended surface, solids, electric discharge, ultra sound, other method, or a combination thereof.

The invention claimed is:

1. A method, comprising:
 injecting a well treatment fluid comprising proppant and an extramerical material through a wellbore and into a fracture in a subterranean formation wherein the injecting is achieved with varied and pulsed proppant concentration in a pumping schedule, the pumping schedule being optimized based on fluid and formation properties, and wherein the introducing is achieved by varying pumping rate during pulses; and placing the proppant in the fracture in a plurality of proppant clusters;

wherein the extramerical material and the proppant are disposed within the fracture, wherein the extramerical material is segregated from the proppant to reinforce the proppant clusters, wherein the extramerical material is selected to have a size and shape to facilitate segregation from the proppant;

wherein the extramerical material is a removable material;

wherein the pumping schedule is regulated in real-time mode to ensure maximum fracture conductivity, effective fracture length, or both;

wherein the pumping schedule is combined with a homogeneous stage at the end of a treatment.

2. The method of claim 1, wherein the extramerical material is degraded by softening, dissolving, melting or reacting.

3. The method of claim 1, wherein the degradation of the extramerical material further enables fluid flow from the formation through the fracture toward the wellbore.

4. The method of claim 3, wherein the extramerical material comprises a solid acid-precursor capable of generating acid in the fracture, a solid base-precursor capable of generating a base in the fracture, or both.

5. The method of claim 3, wherein the extramerical material comprises extramerical materials capable of generating acid in the fracture.

6. The method of claim 1, wherein the wellbore is a vertical wellbore, a wellbore deviated at any angle relative a vertical wellbore, or any combination of both.

7. The method of claim 1, wherein the method is repeated at another fracture in the wellbore.

8. The method of claim 1, wherein the proppant clusters are in transverse or longitudinal fractures along a wellbore deviated at any angle relative a vertical wellbore.

9. The method of claim 1, wherein a zone contacted by the treatment fluid in the formation comprises fine grained sedimentary rock formed by consolidation of clay and silt sized particles into thin, relatively impermeable layers.

10. The method of claim 1, further comprising injecting a fluid comprising extramerical materials in a higher concentration than the well treatment fluid into the fracture.

11. The method of claim 1, wherein the extramerical material is a channelant.

12. The method of claim 11, wherein the extramerical material is not a channelant during the introducing and forming.

13. The method of claim 1, wherein the extramerical material further maintains a structural integrity of the clusters.

14. The method of claim 1, wherein the extramerical material further maintains a separation of the proppant clusters.

15. The method of claim 1 wherein optimization is performed in real time by processing data from surface and bottomhole gauges.

16. The method of claim 1 wherein proppant slurry pulse and clean fluid pulse durations are optimized to ensure maximum fracture conductivity and effective fracture length.

17. The method of claim 1 wherein proppant slurry concentration in pulses is optimized to ensure maximum fracture conductivity and effective fracture length with reduced risk of premature screen-out.

18. The method of claim 1 wherein proppant slurry concentration in pulses is optimized to ensure maximum fracture conductivity and effective fracture length, with minimum proppant volume.

19. The method of claim 1 wherein the extrametrical material has a size and shape matching the size and shape of the proppant to promote segregation.

20. The method of claim 1 wherein the proppant is non-adherent to the extrametrical material after placement in the fracture.

21. A method, comprising:
a) constructing a system in a subterranean formation penetrated by a wellbore, comprising:
i. fracturing the subterranean formation;
ii. injecting a well treatment fluid comprising proppant and a proppant spacing solid extramerical material through a wellbore and into a fracture, wherein the injecting is achieved with varied and pulsed proppant concentration in a pumping schedule, the pumping schedule being optimized based on fluid and formation properties, and wherein the introducing is achieved by varying pumping rate during pulses; and wherein the extramerical material is a non-fibrous degradable material; and
iii. placing the proppant in the fracture in a plurality of proppant clusters; wherein the proppant and the extramerical material are disposed within the fracture in such a way that the extramerical material is segregated from the proppant to reinforce the plurality of proppant clusters, and wherein the extramerical material is selected to have a size and shape to facilitate segregation of the proppant; and
b) producing formation fluids from the formation, through the system of a);

wherein the pumping schedule is regulated in real-time mode to ensure maximum fracture conductivity, effective fracture length, or both;

wherein the pumping schedule is combined with a homogeneous stage at the end of a treatment.

22. The method of claim 21, wherein the extrametrical material consolidates the proppant clusters.

23. The method of claim 21, further comprising injecting a fluid comprising extramerical materials in a higher concentration than the well treatment fluid into the fracture.

24. The method of claim 21, wherein the extrametrical material is a channelant.

25. The method of claim 21, wherein the extrametrical material is not a channelant during the introducing and forming.

26. The method of claim 21 wherein optimization is performed in real time by processing data from surface and bottomhole gauges.

27. The method of claim 21 wherein proppant slurry pulse and clean fluid pulse durations are optimized to ensure maximum fracture conductivity and effective fracture length.

28. The method of claim 21 wherein proppant slurry concentration in pulses is optimized to ensure maximum fracture conductivity and effective fracture length with reduced risk of premature screen-out.

29. The method of claim 21 wherein proppant slurry concentration in pulses is optimized to ensure maximum fracture conductivity and effective fracture length, with minimum proppant volume.

* * * * *